US011165228B2

(12) United States Patent
Monahan (10) Patent No.: US 11,165,228 B2
(45) Date of Patent: Nov. 2, 2021

(54) DYNAMIC TRACK END STOP

(71) Applicant: Schneider Electric USA, Inc., Boston, MA (US)

(72) Inventor: Terry Monahan, Lebanon, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 17/007,758

(22) Filed: Aug. 31, 2020

(65) Prior Publication Data

US 2021/0075198 A1    Mar. 11, 2021

Related U.S. Application Data

(60) Provisional application No. 62/898,877, filed on Sep. 11, 2019.

(51) Int. Cl.
  *H02B 1/36*    (2006.01)
(52) U.S. Cl.
  CPC ...................... *H02B 1/36* (2013.01)
(58) Field of Classification Search
  CPC ............. H02B 1/36; H02B 3/00; H02B 11/12
  See application file for complete search history.

(56) References Cited

U.S. PATENT DOCUMENTS

| 2,711,452 | A | | 6/1955 | Spencer et al. | |
|---|---|---|---|---|---|
| 3,158,700 | A | | 11/1964 | Packard | |
| 4,255,002 | A | * | 3/1981 | Rock | A47B 88/493 384/19 |
| 4,265,583 | A | * | 5/1981 | Baird | B66F 9/12 414/246 |
| 4,728,757 | A | | 3/1988 | Buxton et al. | |
| 5,097,382 | A | * | 3/1992 | Leach | H02B 11/127 361/615 |
| 7,057,123 | B1 | | 6/2006 | Jenkins et al. | |
| 8,198,557 | B2 | | 6/2012 | Lee et al. | |
| 8,288,669 | B2 | | 10/2012 | Capelli | |
| 8,383,970 | B2 | | 2/2013 | Pawar et al. | |
| 9,397,487 | B2 | | 7/2016 | Sims et al. | |
| 9,673,595 | B2 | | 6/2017 | Benke et al. | |
| 10,038,311 | B2 | * | 7/2018 | Kim | H02B 1/306 |

(Continued)

OTHER PUBLICATIONS

Type VR Lift Trucks Instruction Bulletin, 6055-54, Oct. 2011, Square-D, Schneider Electric.

(Continued)

*Primary Examiner* — Robert J Hoffberg
(74) *Attorney, Agent, or Firm* — Locke Lord LLP (57) ABSTRACT

An interlock system for a switchgear cabinet of a drawout switchgear device includes a guide rail in the cabinet to align rollers supporting the drawout switchgear device. A stop plate is spring biased toward a blocking position to block the rollers from rolling off the guide rail. A deflector surface on the stop plate receives a contact force from a fastener hook of a lift truck, to move the stop plate and unblock the rollers. The fastener hook then anchors the lift truck to the cabinet after the stop plate has moved away from the blocking position. A bridging guide rail mounted on the lift truck, aligns with and abuts the guide rail in the cabinet to allow the drawout switchgear device to be safely rolled into or withdrawn from the cabinet by an unassisted service person operating the lift truck.

20 Claims, 6 Drawing Sheets

(56) References Cited

U.S. PATENT DOCUMENTS

| | | | |
|---|---|---|---|
| 10,124,996 B2 * | 11/2018 | Keegan | B66F 9/06 |
| 10,348,066 B2 * | 7/2019 | Robinson | H01H 71/126 |
| 10,833,491 B2 * | 11/2020 | Robinson | H01H 71/0264 |
| 2012/0057276 A1 | 3/2012 | Pawar et al. | |

OTHER PUBLICATIONS

Masterclad™ Metal-Clad Indoor Switchgear, Class 6055, Instruction Bulletin, 6055-30, Rev. 01, May 2014, Square-D, Schneider Electric.

* cited by examiner

FIG. 1

FIG. 2
TOP VIEW

FIG. 6
TOP VIEW

DYNAMIC TRACK END STOP

CROSS REFERENCE TO RELATED APPLICATIONS

This application claims the benefit of and priority to U.S. Provisional Application No. 62/898,877, filed on Sep. 11, 2019 under 35 U.S.C. 119(e), which application is incorporated by reference herein in its entirety.

TECHNICAL FIELD

The present disclosure relates to safely installing or removing a large, drawout switchgear device from a switchgear cabinet with a lift truck.

BACKGROUND

Existing switchgear cabinets are designed to include auxiliary trucks that contain drawout switchgear devices such as transformers, fuses and other assemblies. The auxiliary trucks are removable when maintenance of drawout switchgear devices is required, by rolling them on guide rails mounted on the right and left sides inside the cabinet. A lift truck is provided to aid in the removal and lowering the auxiliary truck to ground level. For safety reasons the position of the lift truck must be secured next to the cabinet so that the auxiliary truck can be rolled out of the cabinet onto the platform of the lift truck. Some types of lift trucks have hooks that latch to the floor of the cabinet, to keep the lift truck securely positioned next to the cabinet. In some types of cabinets, the guide rails have stop plates permanently fastened to the end of the guide rail to prevent accidental falling of the auxiliary truck off the end of the guide rails when the lift truck is not in place. However, the permanent stop plates require the service person to lift the loaded auxiliary truck weighing up to 300 pounds, over the stop plate. The hooks of the lift truck maintain the position and alignment of the lift truck to the guide rails. With the lift truck positioned directly in front of the cabinet, two service persons must be positioned to each side causing them to lift and turn at the waist, which is ergonomically undesirable. There are instances where the auxiliary truck cabinet is located at an elevation above the service persons' shoulders.

What is needed is a simplified interlock system for a switchgear cabinet, which can be easily operated by a single service person solely from the lift truck, to align the lift truck to the guide rails in the cabinet and to securely anchor the lift truck to the cabinet, to enable safely rolling the switchgear into or withdraw it out of the cabinet with the lift truck.

SUMMARY

In accordance with one example embodiment described herein, an apparatus for safely installing or removing a drawout switchgear device in a switchgear cabinet, includes a guide rail in the cabinet to align rollers supporting the drawout switchgear device. A stop plate is mounted near the guide rail in the cabinet and is spring biased to be positioned adjacent to the guide rail. The stop plate has a deflector surface on its front side and a stop edge on its back side configured to block the rollers carrying the drawout switchgear device from rolling on the guide rail while the stop plate is in the spring biased position. The deflector surface is configured to receive a front-to-back directed contact force applied by a fastener projecting from an approaching lift truck, to cause the stop plate to move against the spring bias to move away from the guide rail so that the stop edge unblocks the rollers to roll on the guide rail. A connector is mounted in the switchgear cabinet, positioned to connect with the fastener when it pushes against the stop plate to unblock the rollers. The connector fastens the fastener to the switchgear cabinet and anchors the lift truck to the cabinet. The apparatus may be easily operated by a single service person with the lift truck, to safely align the lift truck to the guide rails in the cabinet and to securely anchor the lift truck to the cabinet.

In accordance with an example embodiment described herein, a bracket is mounted in the switchgear cabinet, supporting the stop plate on a pivot mounted on the bracket and supporting the guide rail adjacent to the stop plate. The connector is a socket (also referred to as a pocket) in the bracket positioned to be at least partially covered by the stop plate while the stop plate is in the spring biased position. The socket is configured to become uncovered by the stop plate when the stop plate is moved away from the guide rail by the front-to-back directed contact force applied by the fastener of the lift truck, so as to be accessible to receive the fastener when the stop plate has unblocked the rollers, to fasten the fastener to the bracket.

In accordance with an example embodiment described herein, the stop plate is configured to pivotally rotate back to the spring biased position in response to removal of the front-to-back directed contact force on the deflector surface of the stop plate applied by the fastener of the lift truck, causing the stop plate to move toward the guide rail so that the stop edge blocks the rollers on the guide rail.

In accordance with an example embodiment described herein, the fastener of the lift truck, has a hook portion with a back-facing surface configured to apply the front-to-back contact force to the deflector surface of the stop plate as the lift truck approaches the cabinet in the front-to-back direction, to cause stop plate to rotate on the pivot away from the guide rail and unblock the rollers to roll on the guide rail of the lift truck.

In accordance with an example embodiment described herein, the lift truck elevates the hook portion of the fastener with respect to the bracket when the lift truck moves the fastener in the front-to-back direction through a front opening of the cabinet, to clear motion of the hook portion over a front end of the bracket to enable applying the front-to-back directed contact force to the deflector surface of the stop plate.

In accordance with an example embodiment described herein, the lift truck lowers the hook portion of the fastener with respect to the bracket after the socket is uncovered by the stop plate when the stop plate is moved away from the guide rail by the front-to-back directed contact force applied by the hook portion. In this manner, the socket becomes accessible to receive the hook portion of the fastener, to latch the hook portion in the socket of the bracket and anchor the lift truck to the cabinet.

In accordance with an example embodiment described herein, a second stop plate is mounted in the switchgear cabinet, and is spring biased to be positioned adjacent to a second guide rail having a front-to-back direction in the switchgear cabinet. The second guide rail is spaced from the first said guide rail. The second stop plate has a second deflector surface on its front side and a stop edge on its back side configured to block second rollers carrying the drawout switchgear device from rolling on the second guide rail while the second stop plate is in the spring biased position. The second deflector surface is configured to receive a front-to-back directed contact force applied by a second fastener projecting from the approaching lift truck, to cause the second stop plate to move against the spring bias to move away from the second guide rail so that the stop edge unblocks the second rollers to roll on the second guide rail. A second connector is mounted in the switchgear cabinet, positioned to connect with the second fastener when it pushes against the second stop plate to unblock the second rollers, to fasten the second fastener to the switchgear cabinet and anchor the lift truck to the switchgear cabinet.

In accordance with an example embodiment described herein, a system for safely installing or removing a drawout switchgear device in a switchgear cabinet with a lift truck, comprises:

a stop plate mounted in a switchgear cabinet and spring biased to be positioned adjacent to a guide rail having a front-to-back direction in the switchgear cabinet, the stop plate having a deflector surface on its front side and a stop edge on its back side configured to block rollers carrying a drawout switchgear device from rolling on the guide rail while the stop plate is in the spring biased position, the deflector surface configured to receive a front-to-back directed contact force;

a fastener projecting from a lift truck, configured to apply the front-to-back directed contact force to the stop plate when the lift truck approaches the switchgear cabinet, to cause the stop plate to move against the spring bias to move away from the guide rail so that the stop edge unblocks the rollers to roll on the guide rail; and a connector mounted in the switchgear cabinet, positioned to connect with the fastener when it pushes against the stop plate to unblock the rollers, to fasten the fastener to the switchgear cabinet and anchor the lift truck to the switchgear cabinet.

In accordance with an example embodiment described herein, a method for safely installing or removing a drawout switchgear device in a switchgear cabinet with a lift truck, comprises:

elevating a hook portion of a fastener of a lift truck with respect a bracket in a switchgear cabinet, to clear motion of the hook portion of the fastener moving over a front end of the bracket;

applying a front-to-back directed contact force with the hook portion to a deflector surface of a stop plate movably mounted on the bracket, the stop plate having a deflector surface on its front side and a stop edge on its back side configured to block rollers carrying the drawout switchgear device, from rolling on a guide rail while the stop plate is in a spring biased position;

moving the stop plate against the spring bias to move away from the guide rail, in response to applying the contact force, so that the stop edge unblocks the rollers to roll on the guide rail; and lowering the hook portion of the fastener of the lift truck with respect the bracket in the cabinet, to insert the hook portion of the fastener into a socket in the bracket, to latch the hook portion in the socket and anchor the lift truck to the cabinet.

In accordance with an example embodiment described herein, the method further comprises:

raising the hook portion of the fastener of the lift truck with respect the bracket in the cabinet, to unlatch the hook portion of the fastener from the socket of the bracket; and withdrawing the front-to-back directed contact force of the hook portion from the deflector surface of the stop plate to allow the spring bias to move the stop plate toward the guide rail, so that the stop edge blocks the rollers from rolling on the guide rail.

The resulting apparatus, system, and method provide a simplified interlock arrangement for a switchgear cabinet, which can be easily operated by a single, unassisted service person operating the lift truck. The lift truck may be aligned to the guide rails in the cabinet and securely anchored to the cabinet, to enable safely rolling the drawout switchgear device into or withdraw it from the cabinet with the lift truck.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
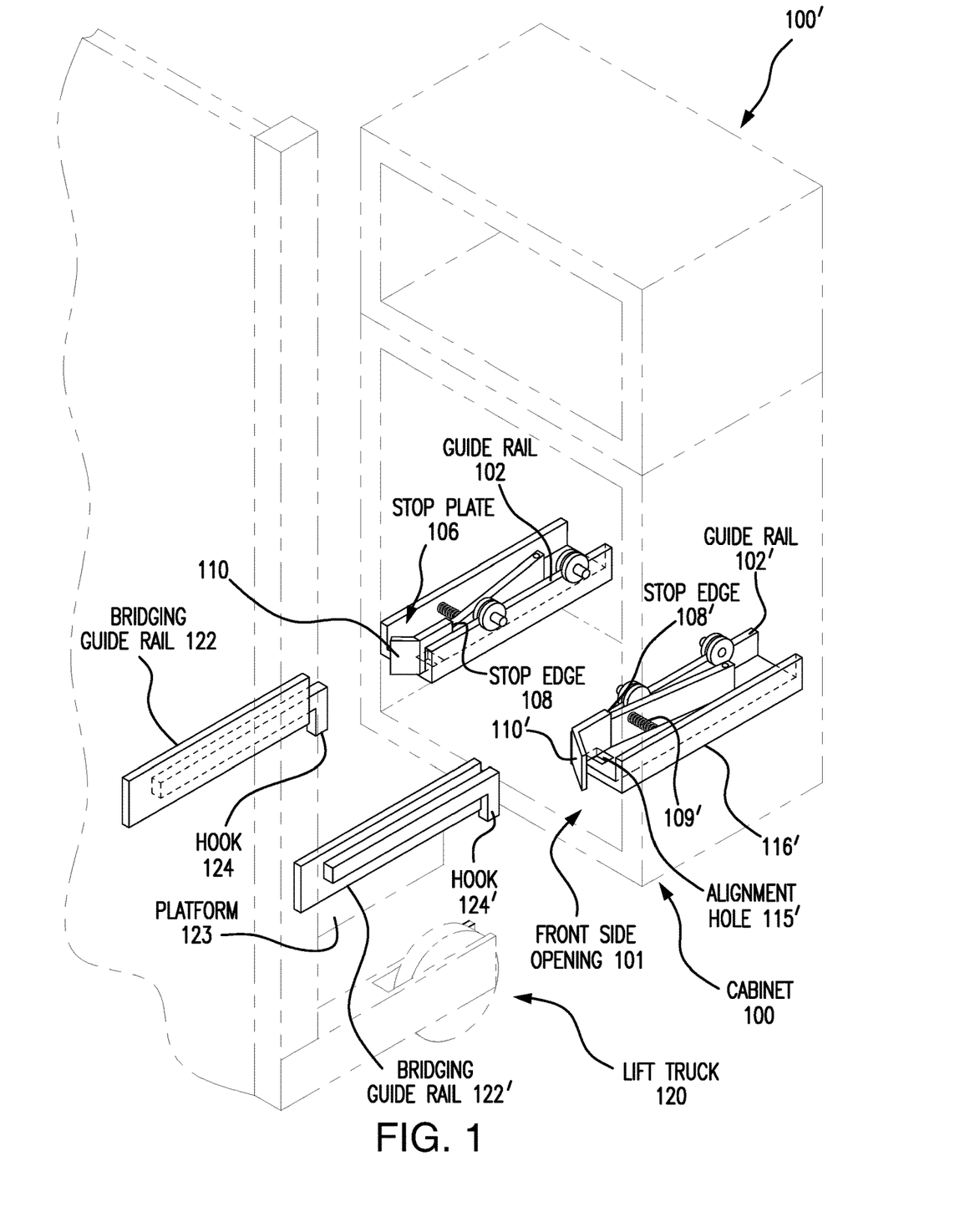
FIG. 1 is a perspective view from the upper right side, of the switchgear cabinet and the lift truck, showing a pair of fastener hooks projecting from the lift truck aligned with a pair of brackets within the cabinet, to abut the bridging guide rails on the lift truck to the guide rails mounted on the brackets in the cabinet, as the lift truck approaches the cabinet, according to an example embodiment of the disclosure.

FIG. 1 illustrates the switchgear cabinet 100 and the lift truck 120. An example switchgear cabinet 100 may be a 5-15 kV metal-clad indoor switchgear cabinet designed for use with drawout switchgear devices such as drawout circuit breakers. The example design may be one-high or two-high compartments, for example, with circuit breakers on the bottom and top or an auxiliary compartment with controls on the top. FIG. 1 illustrates an example two-high design cabinet 100 including an upper compartment 100'. The example switchgear cabinet 100 assembly may consist of individually-grounded steel compartments having doors, barriers, and removable access panels to isolate the separate working functions. Exhaust vents may be located at the top of each compartment, except for the auxiliary compartment. Drawout switchgear devices such as circuit breakers, instrument and control power transformers, relays, meters, and other components may be factory assembled, wired, and tested as an assembly prior to installation in the switchgear cabinet 100. An installer may normally make only the external control, ground, and power connections at the terminals provided, and reconnect the wiring and bus bars at the shipping breaks. Each assembly may be custom designed, with standard structures and bus configurations arranged according to customer specifications. The structures may then be combined with the circuit breaker and other components necessary for the required protective scheme, metering, and number of feeders. An example of a switchgear cabinet 100 is described in U.S. Pat. No. 6,242,702, assigned to the instant assignee, which disclosure is incorporated herein by reference.

Figure 2:
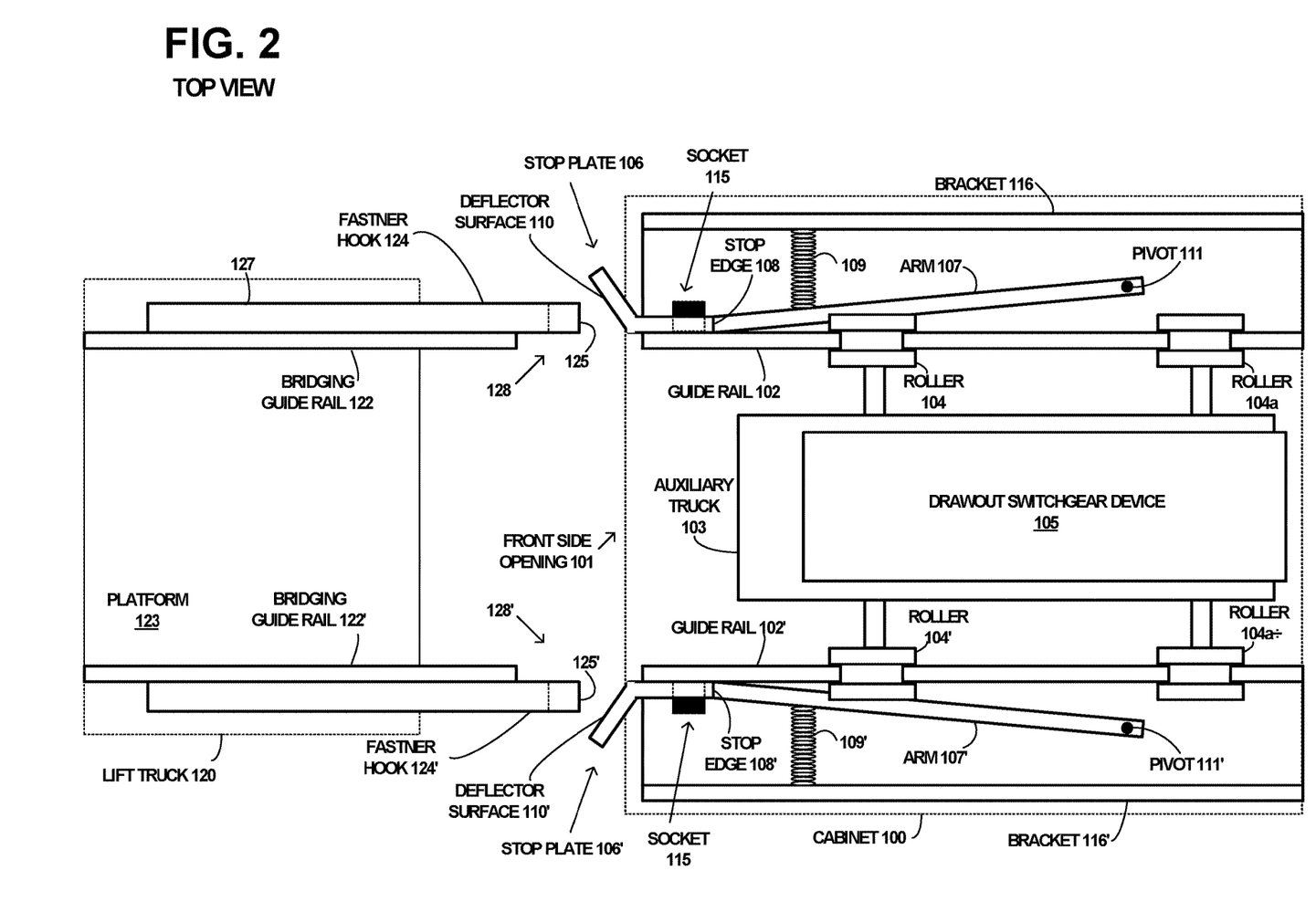
FIG. 2 is a top view of the switchgear cabinet and the lift truck of FIG. 1, showing the lift truck separated from the cabinet and rollers carrying the drawout switchgear device in the cabinet, blocked from rolling on the guide rail while a stop plate is in a spring biased position, according to an example embodiment of the disclosure.

Guide rails 102 and 102' are mounted spaced apart on respective left and right interior side walls of the switchgear cabinet 100 by brackets 116 and 116', shown in the top view of FIG. 2. The left and right sides are viewed from a position facing the front of the cabinet 100. The guide rails 102 and 102' are configured to capture and align one or more rollers 104 and 104', respectively mounted on an auxiliary truck 103 of FIG. 2, supporting the drawout switchgear device 105. The guide rails 102 and 102' guide the auxiliary truck 103 into and out of the cabinet 100 through a front opening 101 on a front side of the cabinet.

The lift truck 120 is used to install or remove drawout switchgear devices 105 from the switchgear cabinet 100, such as for example, circuit breakers, power transformers, relays, and fuse drawout units. Installation of these devices 105 from the lift truck 120 to the switchgear cabinet 100 involves rolling the devices onto two bridging guide rails 122, 122' mounted on the left and right sides of the platform 123 of the lift truck 120, aligning and abutting the bridging guide rails with the respective left and right guide rails 102, 102' in the switchgear cabinet 100, and then rolling the devices 105 from the bridging guide rails 122, 122' onto the guide rails 102, 102' in the compartment of the switchgear cabinet 100. Removal of the drawout switchgear devices 105 from the compartment of the switchgear cabinet 100, is done in approximately the reverse order. The drawout switchgear devices 105 may have their own rollers 104, 104a on the left side and 104', 104a' on the right side to roll on the respective left guide rail 102 and right guide rail 102'. Alternately, the drawout switchgear devices 105 may be carried by an auxiliary truck 103 supported by the rollers 104, 104a on the left side and 104', 104a' on the right side. Auxiliary trucks 103 are removable when maintenance is required by rolling them on guide rails 102, 102'. Most routine maintenance may be performed by moving the drawout switchgear device 105 to a withdrawn position. However, during certain operations such as commissioning or component replacement, the devices 105 must be removed from the switchgear cabinet 100. The use of a lift truck 120 is usually required since drawout switchgear devices 105 are usually quite heavy and the compartments in the switchgear cabinet 100 where they are located may be several feet above the building's floor.

The platform 123 of the lift truck may be raised and lowered by means of a winch and cable arrangement, a pneumatic piston or hydraulic piston arrangement, which is part of the lift truck 120. The bridging guide rails 122, 122' may be removably mounted on the platform 123 or they may be permanently mounted on the platform. An installer may roll the drawout switchgear device or the auxiliary truck carrying the device, placing the rollers onto the bridging guide rails 122, 122'. The installer then pushes the loaded lift truck 120 toward the switchgear cabinet 100 and raises the platform 123 so that the bridging guide rails 122, 122' are aligned with guide rails 102, 102' and the platform 123 is square with the front of the switchgear cabinet 100.

For safety reasons the position of the lift truck 120 must be secured next to the switchgear cabinet 100 so that the drawout switchgear device 105 and auxiliary truck 103 may be safely rolled into the switchgear cabinet 100 from the platform 123 or rolled out of the switchgear cabinet 100 onto the platform of the lift truck 120. According to an example embodiment of the disclosure, a simplified interlock system for the switchgear cabinet 100, may be easily operated by a single service person solely from the lift truck 120, to align the lift truck to the guide rails in the switchgear cabinet and to securely anchor the lift truck to the cabinet, to enable safely rolling the switchgear into or withdraw it from the cabinet with the lift truck.

FIG. 2 is a top view of the switchgear cabinet 100 and the lift truck 120 of FIG. 1, showing the lift truck 120 separated from the switchgear cabinet 100. The rollers 104, 104a roll on the guide rail 102 on the left side of the switchgear cabinet 100 (viewed as facing the cabinet) and the rollers 104', 104a' roll on the guide rail 102' on the right side of the switchgear cabinet 100. The rollers carry the auxiliary truck 103 and the drawout switchgear device 105 on the guide rails 102, 102'. The rollers 104, 104' are blocked from rolling on the respective guide rails 102, 102' while respective stop plates 106, 106' are in a spring biased position, as shown in FIG. 2.

The left bracket 116 in the switchgear cabinet 100, supports the left stop plate 106 on a pivot 111 mounted on the left bracket 116 in FIG. 2. The left bracket 116 supports the left guide rail 102 adjacent to the left stop plate 106. The left stop plate 106 is spring biased by the spring 109 to be positioned adjacent to the left guide rail 102. The left guide rail 102 has a front-to-back direction in the switchgear cabinet 100. The left stop plate 106 has a deflector surface 110 on its front side and a stop edge 108 on its back side in FIG. 2. The stop edge 108 is configured to block the left roller 104 carrying the drawout switchgear device 105 from rolling on the left guide rail 102 while the left stop plate 106 is in the spring biased position shown in FIG. 2. The deflector surface 110 is configured to receive a front-to-back directed contact force applied by a left fastener 124 projecting from the left side of the platform 123 of the approaching lift truck 120 in FIG. 2, to cause the left stop 106 plate to move against the spring bias of the spring 109 to move away from left guide rail 102 so that the stop edge 108 unblocks the roller 104 to roll on the left guide rail 102.

Similarly, the right bracket 116' in the switchgear cabinet 100, supports the right stop plate 106' on a pivot 111' mounted on the right bracket 116' in FIG. 2. The right bracket 116' supports the right guide rail 102' adjacent to the right stop plate 106'. The right stop plate 106' is spring biased by the spring 109' to be positioned adjacent to the right guide rail 102'. The right guide rail 102' has a front-to-back direction in the switchgear cabinet 100. The right stop plate 106' has a deflector surface 110' on its front side and a stop edge 108' on its back side in FIG. 2. The stop edge 108' is configured to block the right roller 104' carrying the drawout switchgear device 105 from rolling on the right guide rail 102' while the right stop plate 106' is in the spring biased position shown in FIG. 2. The deflector surface 110' is configured to receive a front-to-back directed contact force applied by a right fastener 124' projecting from the right side of the platform 123 of the approaching lift truck 120 in FIG. 2, to cause the right stop 106' plate to move against the spring bias of the spring 109' to move away from right guide rail 102' so that the stop edge 108' unblocks the roller 104' to roll on the right guide rail 102'.

FIG. 2 shows the left fastener hook 124 projecting from the left side of the platform 123 of the lift truck 120. The left fastener 124 has a hook portion 128 with a back-facing surface 125 configured to apply a front-to-back contact force to the deflector surface 110 of the left stop plate 106 as the lift truck 120 approaches the switchgear cabinet 100 in the front-to-back direction, to cause left stop plate 106 to rotate on the pivot 111 away from the left guide rail 102 and unblock the roller 104 to roll on the left guide rail 102.

Similarly, FIG. 2 shows the right fastener hook 124' projecting from the right side of the platform 123 of the lift truck 120. The right fastener 124' has a hook portion 128' with a back-facing surface 125' configured to apply a front-to-back contact force to the deflector surface 110' of the right stop plate 106' as the lift truck 120 approaches the switchgear cabinet 100 in the front-to-back direction, to cause right stop plate 106' to rotate on the pivot 111' away from the right guide rail 102' and unblock the roller 104' to roll on the right guide rail 102'.

Figure 3A:
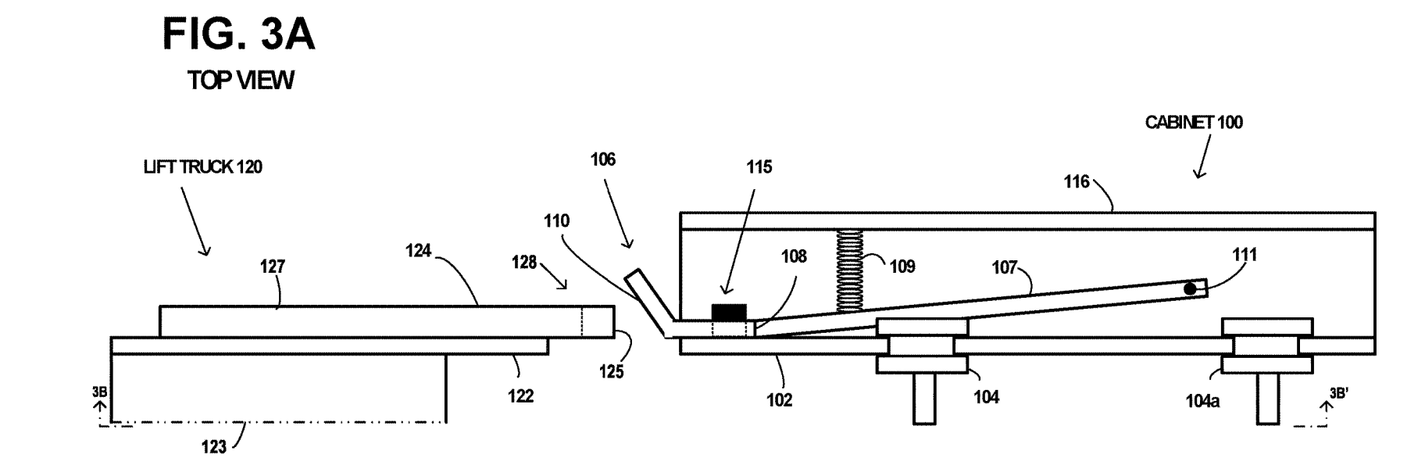
FIG. 3A is a top view of the left side of the switchgear cabinet (as viewed from facing the cabinet) and the lift truck of FIG. 2, showing the fastener hook disengaged from the stop plate and the rollers blocked from rolling on the guide rail while a stop plate is in a spring biased position, according to an example embodiment of the disclosure.
Figure 3B:
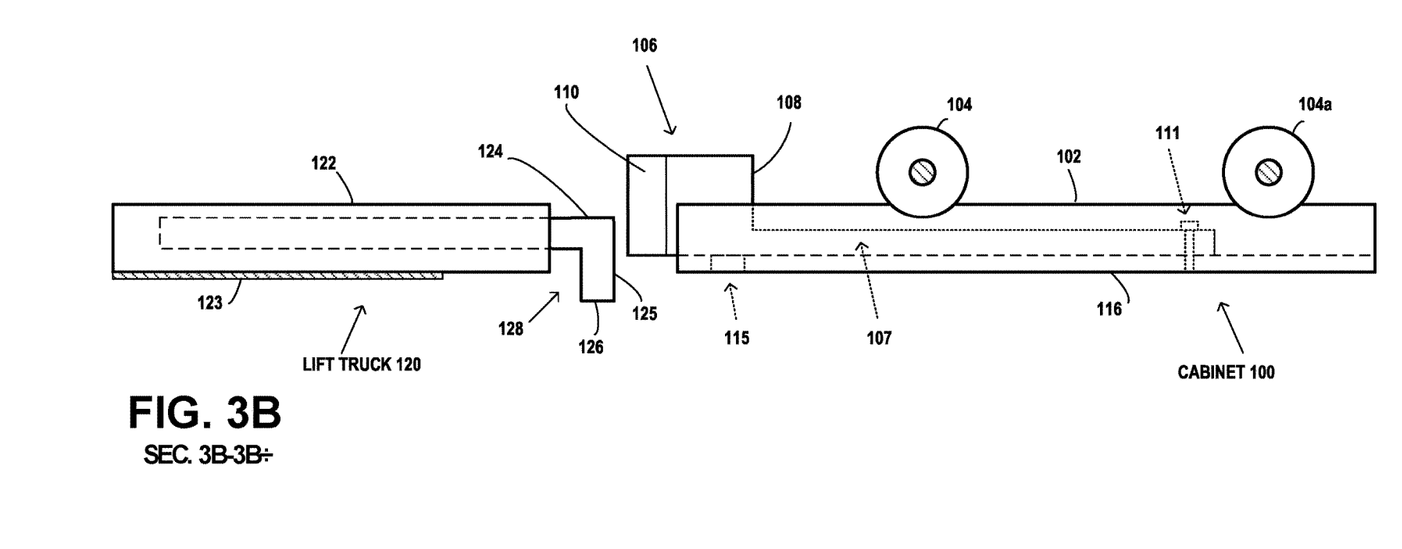
FIG. 3B is a side cross-sectional view along the section line 3B-3B' of FIG. 3A, of the switchgear cabinet and the lift truck of FIG. 1, showing the fastener hook disengaged from the stop plate, according to an example embodiment of the disclosure.

FIG. 3A is a top view of the left side of the switchgear cabinet 100 (viewed from facing the cabinet) and the lift truck 120 of FIG. 2, showing the left fastener hook 124 not engaged with the left stop plate 106 and the roller 104 blocked from rolling on the left guide rail 102 while a stop plate 106 is in the spring biased position. FIG. 3B is a side cross-sectional view along the section line 3B-3B' of FIG. 3A, of the switchgear cabinet 100 and the lift truck 120 of FIG. 1, showing the fastener hook 124 not engaged with the stop plate 106. The tip 126 and the end 125 of the hook portion 128 of the left the left fastener hook 124 is shown in FIG. 3B.

Figure 4A:
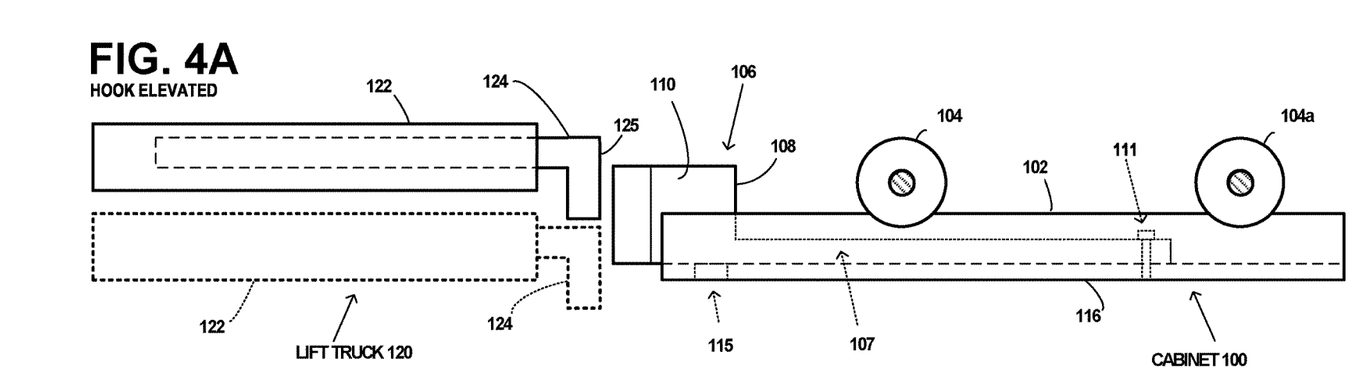
FIG. 4A is a side view, of the switchgear cabinet and the lift truck of FIG. 2, showing the fastener hook elevated by operation of the lift truck, in preparation for the lift truck to move toward the cabinet, advancing the fastener hook through the front opening of the cabinet, to clear the motion of the fastener hook over the front end of the bracket, according to an example embodiment of the disclosure.
Figure 4B:
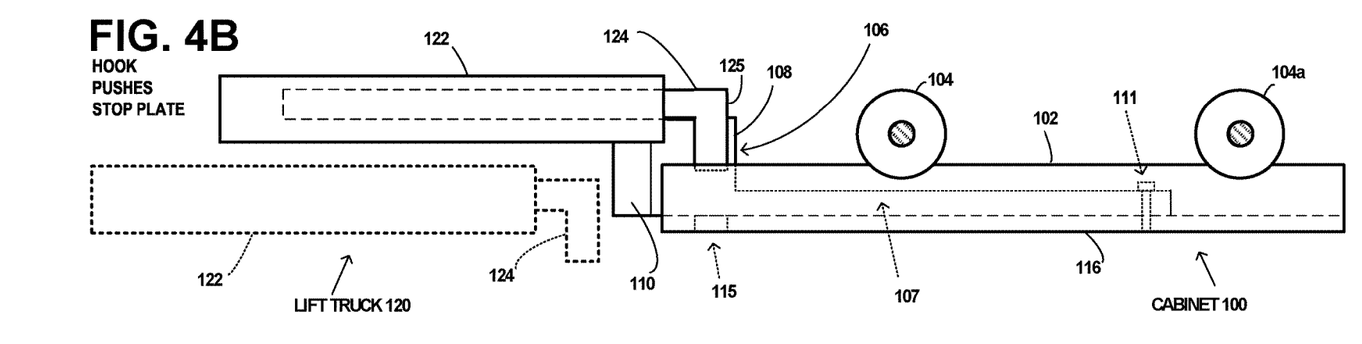
FIG. 4B is a side view, of the switchgear cabinet and the lift truck of FIG. 4A, showing the fastener hook imparting the front-to-back contact force to the stop plate as the lift truck approaches the cabinet in the front-to-back direction, to cause stop plate to rotate on a pivot away from the guide rail and unblock the rollers, according to an example embodiment of the disclosure.

FIG. 4A is a side view, of the switchgear cabinet 100 and the lift truck 120 of FIG. 2, showing the left fastener hook 124 elevated by operation of the lift truck 120, in preparation for the lift truck 120 to move toward the switchgear cabinet 100. The left fastener hook 124 is elevated when it is advanced through the front opening 101 of the cabinet 100, so as to clear the tip 126 of the hook portion 128 as it passes over the front end of the left bracket 116. FIG. 4B is a side view, of the switchgear cabinet and the lift truck of FIG. 4A, showing the left fastener hook 124 advancing and imparting the front-to-back contact force to the left stop plate 106 as the lift truck 120 approaches the switchgear cabinet 100 in the front-to-back direction. This application of the front-to-back contact force causes the left stop plate 106 to rotate on the pivot 111 away from the left guide rail 102 and unblock the roller 104. The advancing left fastener hook 124 moves the tip 126 of the hook portion 128 into a juxtaposed position over the connector or socket 115 of the left bracket 116, to enable fastening to the socket 115.

Figure 4C:
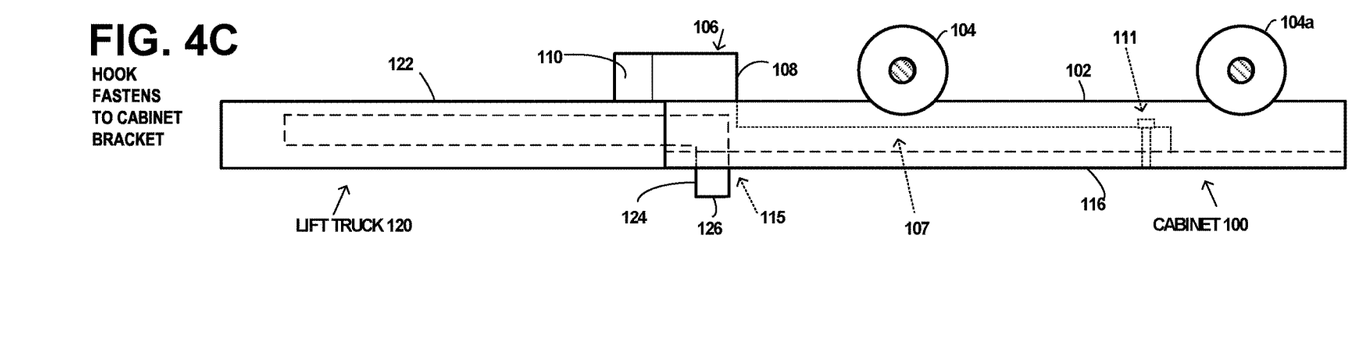
FIG. 4C is a side view, of the switchgear cabinet and the lift truck of FIG. 4B, showing the fastener hook lowered by operation of the lift truck into the socket in the bracket, after the stop plate has been pivotally rotated away from the blocking position, to anchor the lift truck to the cabinet, according to an example embodiment of the disclosure.

FIG. 4C is a side view, of the switchgear cabinet 100 and the lift truck 120 of FIG. 4B, showing the left fastener hook 124 lowered by operation of the lift truck 120 to insert the tip 126 of the hook portion 128 of the left fastener hook 124, into the socket 115 of the left bracket 116, after the left stop plate 106 has pivotally rotated away from the blocking position at the left guide rail 102. Inserting the tip 126 of the hook portion 128 into the socket 115 fastens the left fastener hook 124 to the left bracket 116 and anchors the lift truck 120 to the switchgear cabinet 100. The tip 126 of the hook portion 128 may be tapered to facilitate insertion into the socket 115. The figures show the left bridging guide rail 122 mounted on the lift truck 120 aligning with and abutting the left guide rail 102 in the switchgear cabinet 100, when the left fastener hook 124 is fastened to the left bracket 116.

Figure 5A:
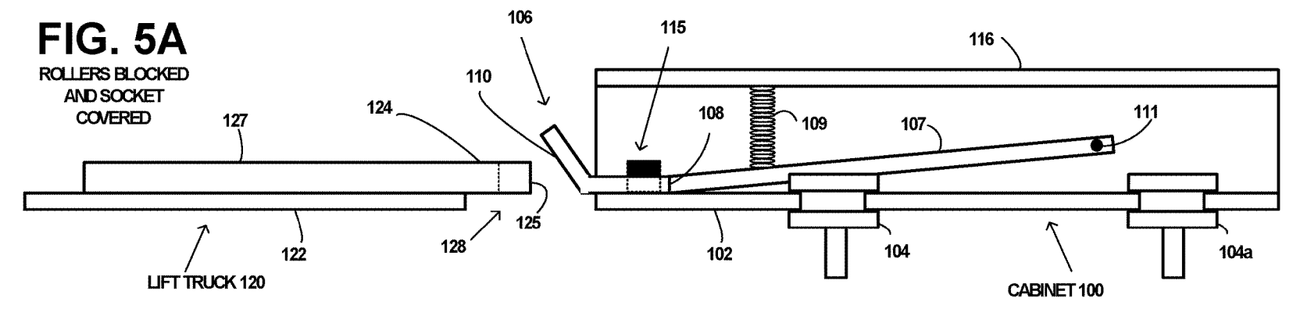
FIG. 5A is a top view, of the switchgear cabinet and the lift truck of FIG. 4A, showing the rollers blocked and the socket covered so as not to be accessible by the fastener hook, according to an example embodiment of the disclosure.
Figure 5B:
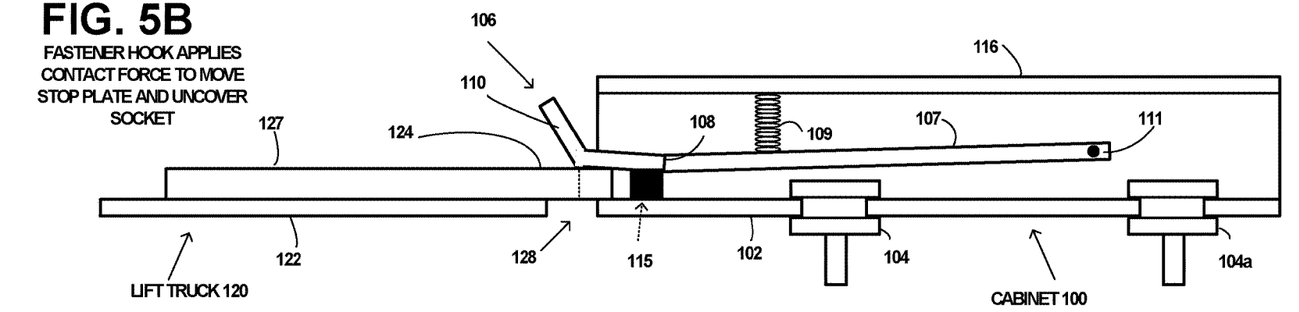
FIG. 5B is a top view, of the switchgear cabinet and the lift truck of FIG. 4B, showing the fastener hook imparting the front-to-back contact force to the stop plate as the lift truck approaches the cabinet in the front-to-back direction, to cause stop plate to rotate on a pivot away from the guide rail and unblock the rollers, uncover the socket, and the fastener hook advancing into position to fasten to the socket in the bracket, according to an example embodiment of the disclosure.
Figure 5C:
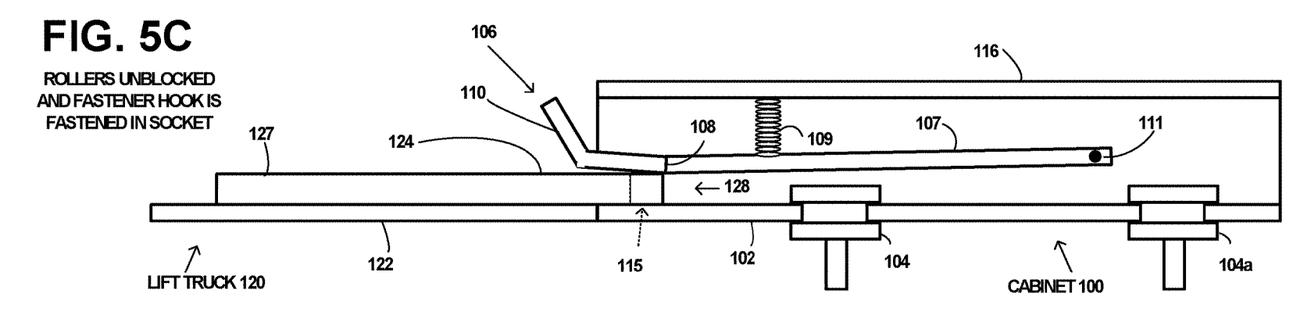
FIG. 5C is a top view, of the switchgear cabinet and the lift truck of FIG. 4C, showing the rollers unblocked and the fastener hook fastened in the socket, thereby anchoring the lift truck to the cabinet, according to an example embodiment of the disclosure.

FIG. 5A is a top view, of the switchgear cabinet and the lift truck of FIG. 4A, showing the roller 104 blocked and the socket 115 covered by the left stop plate 106 so as not to be accessible by the hook portion 128 of the left fastener hook 124. FIG. 5B is a top view, of the switchgear cabinet and the lift truck of FIG. 4B, showing the left fastener hook 124 advancing and applying the front-to-back contact force of the back-facing surface 125 to the left stop plate 106 as the lift truck 120 approaches the switchgear cabinet 100 in the front-to-back direction. The front-to-back contact force causes the left stop plate 106 to rotate on the pivot 111 away from the left guide rail 102 and unblock the roller 104. The motion of the left stop plate 106 in pivoting about the pivot 111 uncovers the socket 115 so as to be accessible to receive the tip 126 of the hook portion 128 when the stop plate has unblocked the roller 104, to fasten the left fastener hook 124 to the left bracket 116. FIG. 5C is a top view, of the switchgear cabinet and the lift truck of FIG. 4C, showing the roller 104 unblocked and the left fastener hook 124 fastened in the socket 115 of the left bracket 116, thereby anchoring the lift truck 120 to the switchgear cabinet 100.

Figure 6:
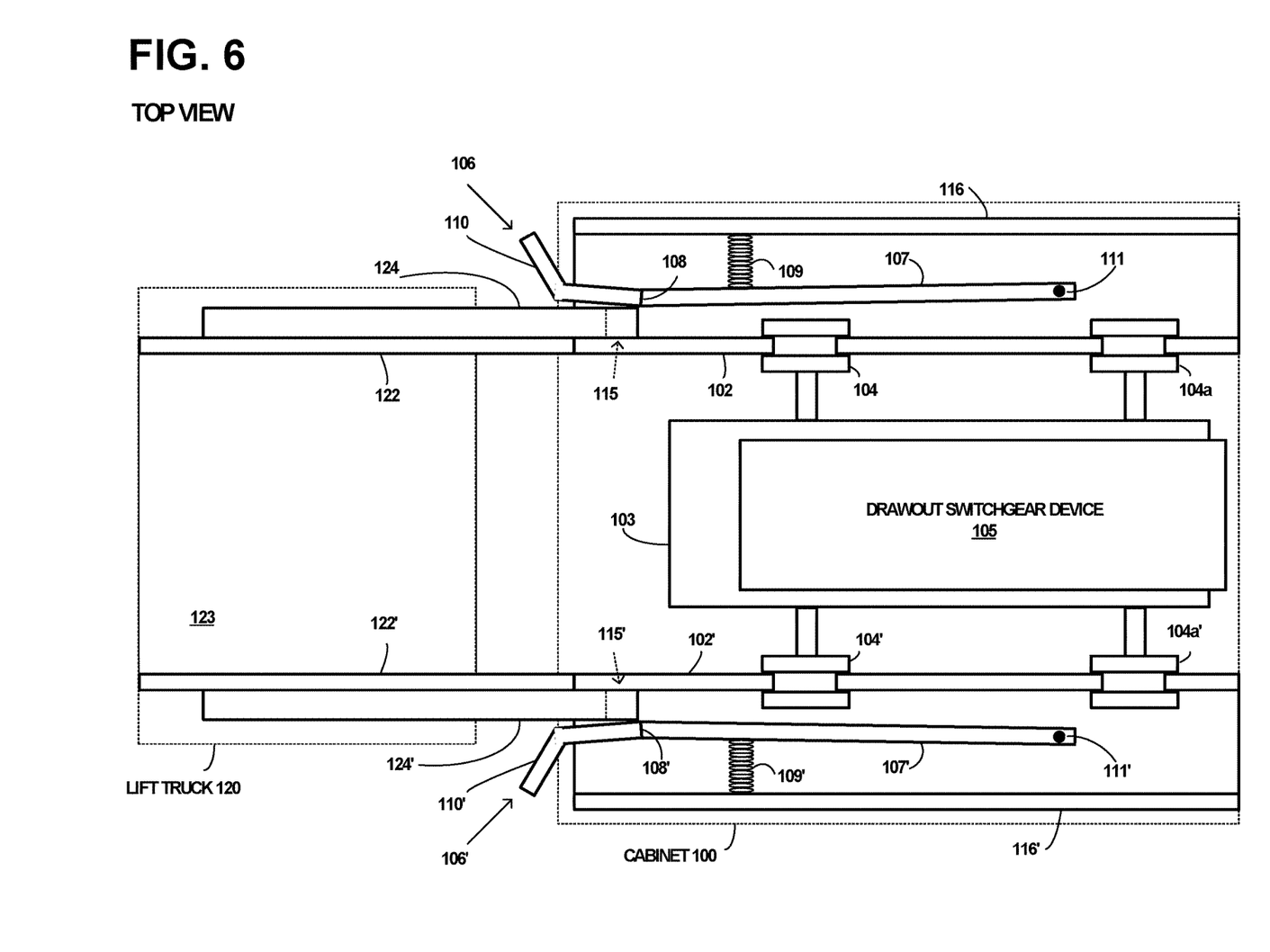
FIG. 6 is a top view of the switchgear cabinet and the lift truck of FIG. 2, showing the lift truck fully advanced toward the cabinet, with the fastener hook of the lift truck, applying a front-to-back contact force to the stop plate, to cause stop plate to rotate on a pivot away from the guide rail and unblock the rollers to roll on the guide rail, the fastener hook advancing into position to fasten to a socket in the bracket, thereby anchoring the lift truck to the cabinet, according to an example embodiment of the disclosure.

FIG. 6 is a top view of the switchgear cabinet 100 and the lift truck 120 of FIG. 2, showing the lift truck 120 fully advanced toward the cabinet 100. The left fastener hook 124 of the lift truck is shown with the back-facing surface 125 applying the front-to-back contact force of the back-facing surface 125 to the left stop plate 106 as the lift truck 120 approaches the cabinet 100 in the front-to-back direction. The front-to-back contact force causes the left stop plate 106 to rotate on the pivot 111 away from the left guide rail 102 and unblock the roller 104 to roll on the left guide rail 102. The tip 126 of the left fastener hook 124 advances into position to fasten to the left socket 115 in the left bracket 116, to thereby anchor the lift truck 120 to the switchgear cabinet 100.

Similarly, FIG. 6 shows the right fastener hook 124' of the lift truck shown with the back-facing surface 125' applying the front-to-back contact force to the right stop plate 106' as the lift truck 120 approaches the cabinet 100 in the front-to-back direction. The front-to-back contact force causes the right stop plate 106' to rotate on the pivot 111' away from the right guide rail 102' and unblock the roller 104' to roll on the right guide rail 102'. The tip 126 of the right fastener hook 124' advances into position to fasten to the right socket 115' in the right bracket 116', to thereby anchor the lift truck 120 to the switchgear cabinet 100.

The stop plate 106 is configured to pivotally rotate back and return to the spring biased position in response to removal of the front-to-back directed contact force by the fastener hook 124 on the deflector surface 110 of the stop plate 106, when the lift truck backs away from the switchgear cabinet, thereby causing the stop plate 106 to move toward the left guide rail 102 so that the stop edge 108 blocks the roller 104 from rolling on the guide rail 102.

A method for safely installing or removing a drawout switchgear device in a switchgear cabinet with a lift truck, includes:
  elevating a hook portion of a fastener of a lift truck with respect a bracket in a switchgear cabinet, to clear motion of the hook portion of the fastener moving over a front end of the bracket;
  applying a front-to-back directed contact force with the hook portion to a deflector surface of a stop plate movably mounted on the bracket, the stop plate having a deflector surface on its front side and a stop edge on its back side configured to block rollers carrying the drawout switchgear device, from rolling on a guide rail while the stop plate is in a spring biased position;
  moving the stop plate against the spring bias to move away from the guide rail, in response to applying the contact force, so that the stop edge unblocks the rollers to roll on the guide rail; and
  lowering the hook portion of the fastener of the lift truck with respect the bracket in the cabinet, to insert the hook portion of the fastener into a socket in the bracket, to latch the hook portion in the socket and anchor the lift truck to the cabinet.

The method for safely installing or removing a drawout switchgear device in a switchgear cabinet with a lift truck, further includes:
  raising the hook portion of the fastener of the lift truck with respect the bracket in the cabinet, to unlatch the hook portion of the fastener from the socket of the bracket; and
  withdrawing the front-to-back directed contact force of the hook portion from the deflector surface of the stop plate to allow the spring bias to move the stop plate toward the guide rail, so that the stop edge blocks the rollers from rolling on the guide rail.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "component", "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus for safely installing or removing a drawout switchgear device in a switchgear cabinet, comprising:
    a stop plate mounted in the switchgear cabinet and spring biased to be positioned adjacent to a guide rail having a front-to-back direction in the switchgear cabinet, the stop plate having a deflector surface on a front side of the stop plate and a stop edge on a back side of the stop plate configured to block rollers carrying the drawout switchgear device from rolling on the guide rail while the stop plate is in a spring biased position, the deflector surface configured to receive a front-to-back directed contact force applied by a fastener projecting from a lift truck when the lift truck approaches the switchgear cabinet, to cause the stop plate to move away from the spring biased position and away from the guide rail so that the stop edge unblocks the rollers to roll on the guide rail; and
    a connector mounted in the switchgear cabinet, positioned to connect with the fastener when it pushes against the stop plate to unblock the rollers, to fasten the fastener to the switchgear cabinet and anchor the lift truck to the switchgear cabinet.

2. The apparatus for safely installing or removing the drawout switchgear device in the switchgear cabinet of claim 1, further comprising:
    a bracket mounted in the switchgear cabinet, supporting the stop plate on a pivot mounted on the bracket and supporting the guide rail adjacent to the stop plate; and
    wherein the connector is a socket in the bracket positioned to be at least partially covered by the stop plate while the stop plate is in the spring biased position, configured to become uncovered by the stop plate when the stop plate is moved away from the guide rail by the front-to-back directed contact force applied by the fastener of the lift truck, so as to be accessible to receive the fastener when the stop plate has unblocked the rollers, to fasten the fastener to the bracket.

3. The apparatus for safely installing or removing the drawout switchgear device in the switchgear cabinet of claim 2, wherein the stop plate is configured to pivotally rotate back to the spring biased position in response to removal of the front-to-back directed contact force on the deflector surface of the stop plate applied by the fastener of the lift truck, causing the stop plate to move toward the guide rail so that the stop edge blocks the rollers on the guide rail.

4. The apparatus for safely installing or removing the drawout switchgear device in the switchgear cabinet of claim 3, wherein the fastener of the lift truck, has a hook portion with a back-facing surface configured to apply the front-to-back contact force to the deflector surface of the stop plate as the lift truck approaches the switchgear cabinet in the front-to-back direction, to cause stop plate to rotate on the pivot away from the guide rail and unblock the rollers to roll on the guide rail.

5. The apparatus for safely installing or removing the drawout switchgear device in the switchgear cabinet of claim 4, wherein the lift truck elevates the hook portion of the fastener with respect to the bracket when the lift truck moves the fastener in the front-to-back direction through a front opening of the switchgear cabinet, to clear motion of the hook portion over a front end of the bracket to enable applying the front-to-back directed contact force to the deflector surface of the stop plate.

6. The apparatus for safely installing or removing a drawout switchgear device in a switchgear cabinet of claim 5, wherein the lift truck lowers the hook portion of the fastener with respect to the bracket after the socket is uncovered by the stop plate when the stop plate is moved away from the guide rail by the front-to-back directed contact force applied by the hook portion, so that the socket is accessible to receive a hook portion of the fastener, to latch the hook portion in the socket of the bracket and anchor the lift truck to the switchgear cabinet.

7. The apparatus for safely installing or removing the drawout switchgear device in the switchgear cabinet of claim 1, wherein the guide rail is a first guide rail, and
    the apparatus further comprising:
        a second stop plate mounted in the switchgear cabinet, and spring biased to be positioned adjacent to a second guide rail having a second front-to-back direction in the switchgear cabinet, spaced from the first guide rail, the second stop plate having a second deflector surface on a front side of the second stop plate and a second stop edge on a back side of the second stop plate configured to block second rollers carrying the drawout switchgear device from rolling on the second guide rail while the second stop plate is in a second spring biased position, the second deflector surface configured to receive a second front-to-back directed contact force applied by a second fastener projecting from the lift truck when the lift truck approaches the switchgear cabinet, to cause the second stop plate to move away from the second spring biased position and away from the second guide rail so that the second stop edge unblocks the second rollers to roll on the second guide rail; and a second connector mounted in the switchgear cabinet, positioned to connect with the second fastener when it pushes against the second stop plate to unblock the second rollers, to fasten the second fastener to the switchgear cabinet and anchor the lift truck to the switchgear cabinet.

8. The apparatus for safely installing or removing the drawout switchgear device in the switchgear cabinet of claim 7, further comprising:

a second bracket mounted in the switchgear cabinet, supporting the second stop plate on a second pivot mounted on the second bracket and supporting the second guide rail adjacent to the second stop plate; and wherein the second connector is a second socket in the second bracket positioned to be at least partially covered by the second stop plate while the second stop plate is in the second spring biased position, configured to become uncovered by the second stop plate when the second stop plate is moved away from the second guide rail by the second front-to-back directed contact force applied by the second fastener of the lift truck, so as to be accessible to receive the second fastener when the second stop plate has unblocked the second rollers, to fasten the second fastener to the second bracket.

9. The apparatus for safely installing or removing the drawout switchgear device in the switchgear cabinet of claim 8, wherein the fastener is a first fastener and the connector is a first connector, and wherein first and second bridging guide rails mounted on the lift truck, are configured to respectively align with and abut the first and second guide rails in the switchgear cabinet, when the first and second fasteners are fastened in the first and second connectors, respectively.

10. The apparatus for safely installing or removing the drawout switchgear device in the switchgear cabinet of claim 1, wherein the rollers are mounted on an auxiliary truck carrying the drawout switchgear device, and wherein the drawout switchgear device is at least one of a voltage transformer, a control power transformer, one or more primary fuses, or switchgear.

11. A system for safely installing or removing a drawout switchgear device in a switchgear cabinet with a lift truck, comprising:

a stop plate mounted in the switchgear cabinet and spring biased to be positioned adjacent to a guide rail having a front-to-back direction in the switchgear cabinet, the stop plate having a deflector surface on a front side of the stop plate and a stop edge on a back side of the stop plate configured to block rollers carrying the drawout switchgear device from rolling on the guide rail while the stop plate is in a spring biased position, the deflector surface configured to receive a front-to-back directed contact force;

a fastener projecting from the lift truck, configured to apply the front-to-back directed contact force to the stop plate when the lift truck approaches the switchgear cabinet, to cause the stop plate to move away from the spring biased position and away from the guide rail so that the stop edge unblocks the rollers to roll on the guide rail; and a connector mounted in the switchgear cabinet, positioned to connect with the fastener when it pushes against the stop plate to unblock the rollers, to fasten the fastener to the switchgear cabinet and anchor the lift truck to the switchgear cabinet.

12. The system for safely installing or removing the drawout switchgear device in the switchgear cabinet of claim 11, further comprising:

a bracket mounted in the switchgear cabinet, supporting the stop plate on a pivot mounted on the bracket and supporting the guide rail adjacent to the stop plate; and wherein the connector is a socket in the bracket positioned to be at least partially covered by the stop plate while the stop plate is in the spring biased position, configured to become uncovered by the stop plate when the stop plate is moved away from the guide rail by the front-to-back directed contact force applied by the fastener of the lift truck, so as to be accessible to receive the fastener when the stop plate has unblocked the rollers, to fasten the fastener to the bracket.

13. The system for safely installing or removing the drawout switchgear device in the switchgear cabinet of claim 12, wherein the stop plate is configured to pivotally rotate back to the spring biased position in response to removal of the front-to-back directed contact force on the deflector surface of the stop plate applied by the fastener of the lift truck, causing the stop plate to move toward the guide rail so that the stop edge blocks the rollers on the guide rail.

14. The system for safely installing or removing the drawout switchgear device in the switchgear cabinet of claim 13, wherein the fastener of the lift truck, has a hook portion with a back-facing surface configured to apply the front-to-back contact force to the deflector surface of the stop plate as the lift truck approaches the cabinet in the front-to-back direction, to cause stop plate to rotate on the pivot away from the guide rail and unblock the rollers to roll on the guide rail.

15. The system for safely installing or removing the drawout switchgear device in the switchgear cabinet of claim 14, wherein the lift truck elevates the hook portion of the fastener with respect to the bracket when the lift truck moves the fastener in the front-to-back direction through a front opening of the switchgear cabinet, to clear motion of the hook portion over a front end of the bracket to enable applying the front-to-back directed contact force to the deflector surface of the stop plate.

16. The system for safely installing or removing the drawout switchgear device in the switchgear cabinet of claim 15, wherein the lift truck lowers the hook portion of the fastener with respect to the bracket after the socket is uncovered by the stop plate when the stop plate is moved away from the guide rail by the front-to-back directed contact force applied by the hook portion, so that the socket is accessible to receive a hook portion of the fastener, to latch the hook portion in the socket of the bracket and anchor the lift truck to the switchgear cabinet.

17. The system for safely installing or removing the drawout switchgear device in the switchgear cabinet of claim 11, wherein the guide rail is a first guide rail, and the system further comprising:

a second stop plate mounted in the switchgear cabinet, and spring biased to be positioned adjacent to a second guide rail having a second front-to-back direction in the switchgear cabinet, spaced from the first guide rail, the second stop plate having a second deflector surface on a front side of the second stop plate and a second stop edge on a back side of the second stop plate configured to block second rollers carrying the drawout switchgear device from rolling on the second guide rail while the second stop plate is in the second spring biased position, the second deflector surface configured to receive a second front-to-back directed contact force applied by a second fastener projecting from the lift truck when the lift truck approaches the switchgear cabinet, to cause the second stop plate to move away from the second spring biased position and away from the second guide rail so that the second stop edge unblocks the second rollers to roll on the second guide rail; and a second connector mounted in the switchgear cabinet, positioned to connect with the second fastener when it pushes against the second stop plate to unblock the second rollers, to fasten the second fastener to the switchgear cabinet and anchor the lift truck to the switchgear cabinet.

18. The system for safely installing or removing the drawout switchgear device in the switchgear cabinet of claim 17, further comprising:

a second bracket mounted in the switchgear cabinet, supporting the second stop plate on a second pivot mounted on the second bracket and supporting the second guide rail adjacent to the second stop plate; and wherein the second connector is a second socket in the second bracket positioned to be at least partially covered by the second stop plate while the second stop plate is in the second spring biased position, configured to become uncovered by the second stop plate when the second stop plate is moved away from the second guide rail by the second front-to-back directed contact force applied by the second fastener of the lift truck, so as to be accessible to receive the second fastener when the second stop plate has unblocked the second rollers, to fasten the second fastener to the second bracket.

19. A method for safely installing or removing a drawout switchgear device in a switchgear cabinet with a lift truck, comprising:

elevating a hook portion of a fastener of the lift truck with respect a bracket in the switchgear cabinet, to clear motion of the hook portion of the fastener moving over a front end of the bracket;

applying a front-to-back directed contact force with the hook portion to a deflector surface of a stop plate movably mounted on the bracket, the stop plate having a deflector surface on a front side of the stop plate and a stop edge on a back side of the stop plate configured to block rollers carrying the drawout switchgear device, from rolling on a guide rail while the stop plate is in a spring biased position;

moving the stop plate away from the spring biased position and away from the guide rail, in response to applying the front-to-back directed contact force, so that the stop edge unblocks the rollers to roll on the guide rail; and lowering the hook portion of the fastener of the lift truck with respect the bracket in the switchgear cabinet, to insert the hook portion of the fastener into a socket in the bracket, to latch the hook portion in the socket and anchor the lift truck to the switchgear cabinet.

20. The method for safely installing or removing the drawout switchgear device in the switchgear cabinet with the lift truck of claim 19, further comprising:

raising the hook portion of the fastener of the lift truck with respect the bracket in the switchgear cabinet, to unlatch the hook portion of the fastener from the socket of the bracket; and withdrawing the front-to-back directed contact force of the hook portion from the deflector surface of the stop plate to allow the spring bias to move the stop plate toward the guide rail, so that the stop edge blocks the rollers from rolling on the guide rail.

* * * * *